United States Patent Office 2,860,779
Patented Nov. 18, 1958

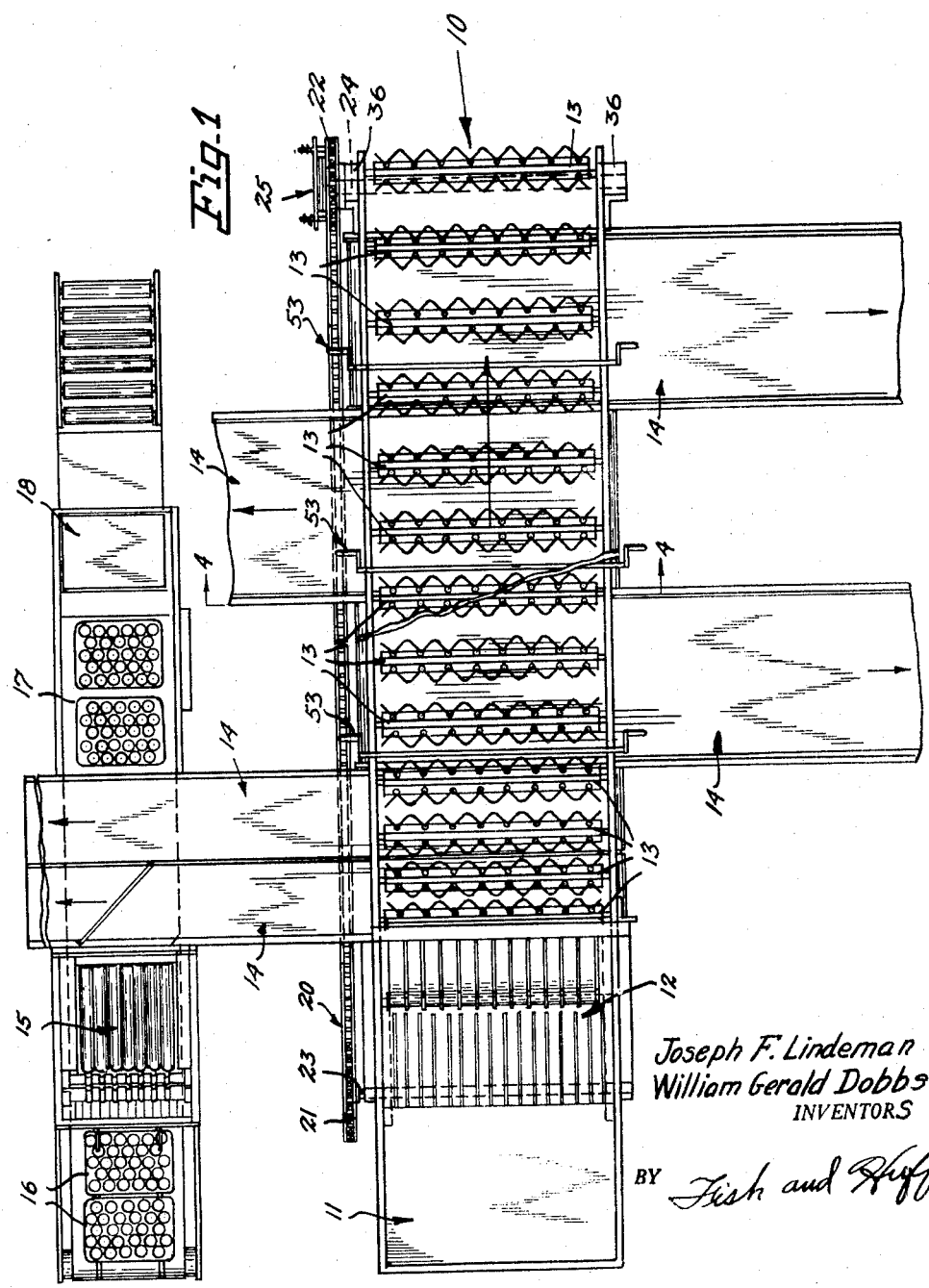

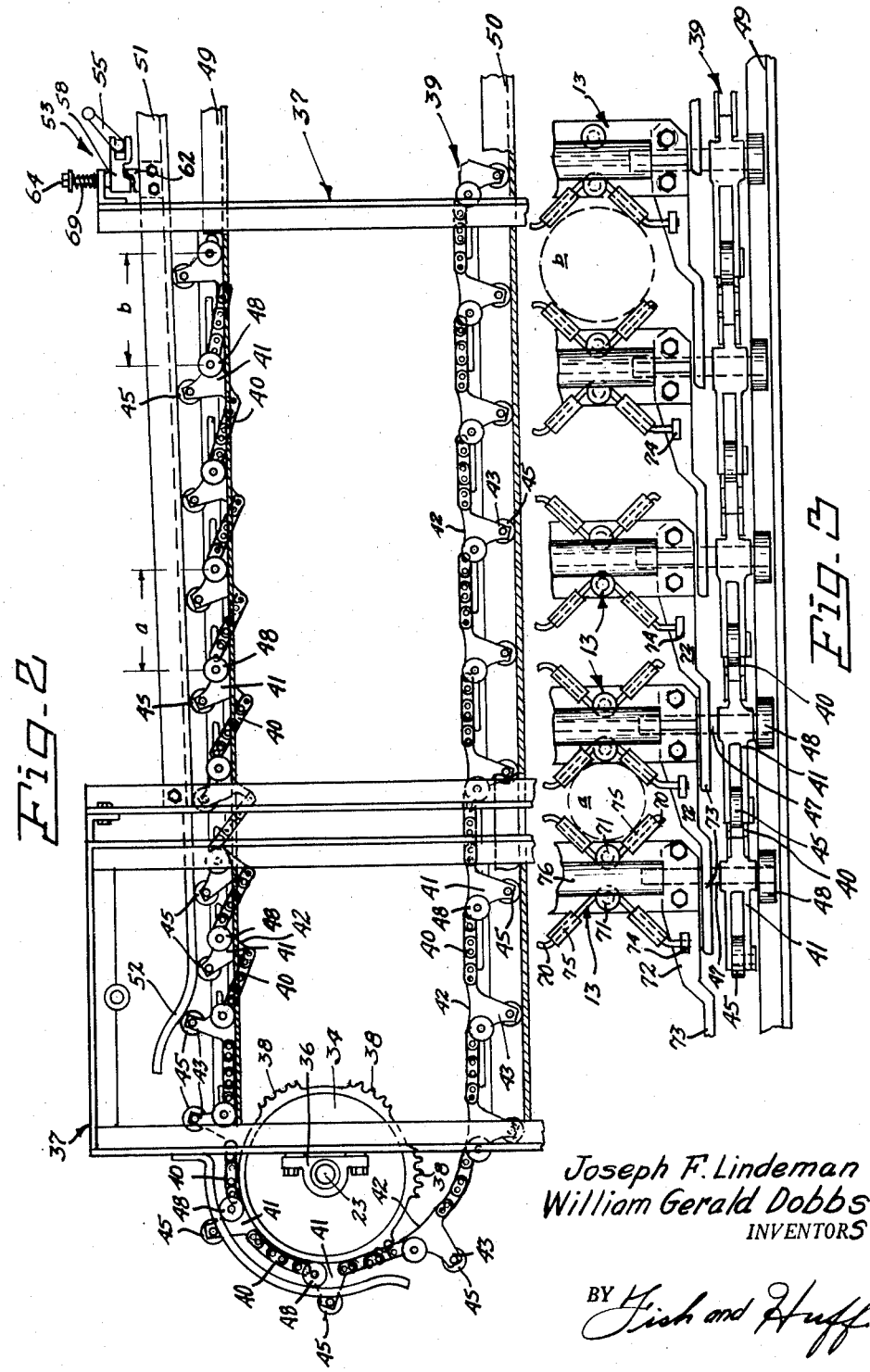

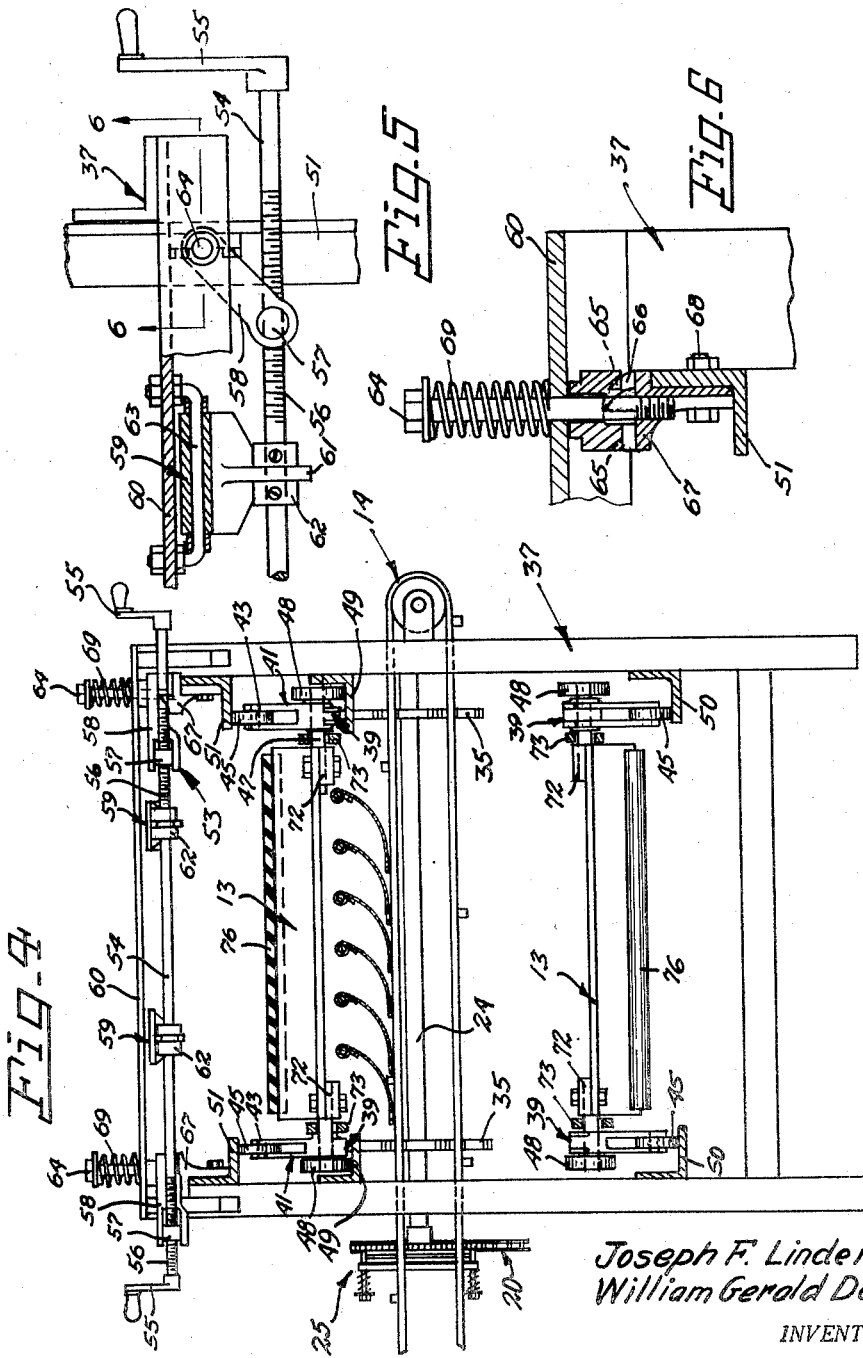

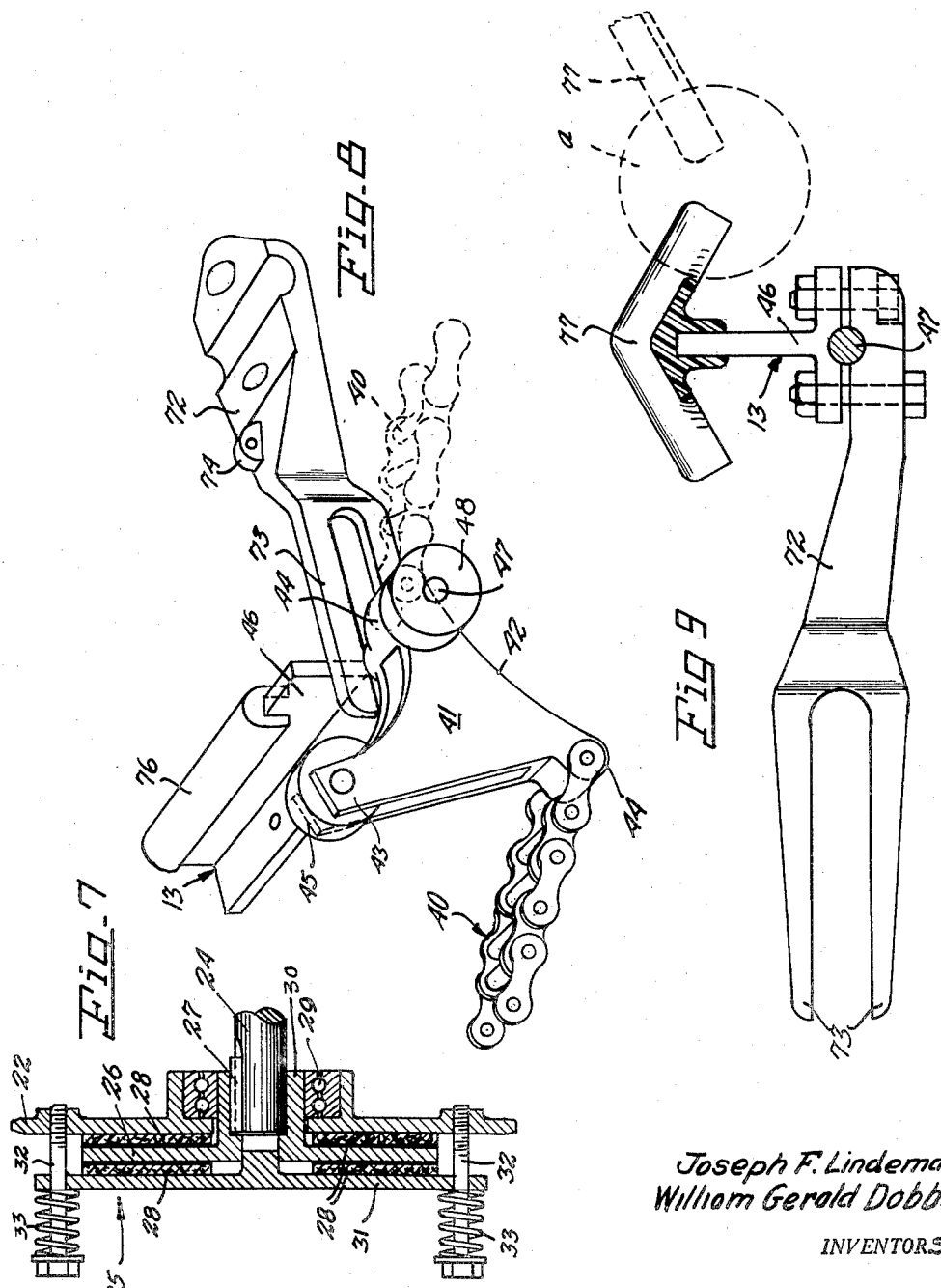

2,860,779

MACHINE FOR GRADING ARTICLES BY SIZE

Joseph F. Lindeman and William Gerald Dobbs, Yakima, Wash., assignors to Northwest Equipment Company, Inc., a corporation of Washington Application April 28, 1955, Serial No. 504,579

7 Claims. (Cl. 209—84)

This invention relates to new and improved means for grading articles by size. The invention is primarily designed and intended for use in grading fruit such as apples, peaches, oranges, prunes, and tomatoes, but it is also applicable to the grading of other articles of general spherical or ovoid configuration.

Briefly, our invention comprises a machine for grading articles by size which has a plurality of spaced parallel conveying members having means for effecting movement of the conveying members in a common plane at right angles to their several axes, and other means provided for progressively widening the spacing between successive conveying members. It is therefore one object of the invention to provide means for grading articles by size wherein the article supporting conveying members progressively separate to permit dropping of the articles between conveying members at a number of predetermined points along the effective travel of the conveyor in accordance with the peripheral size of the article being graded.

Another object of the invention lies in the provision of means for grading articles by size, wherein the spacing between the conveying members may increase in direct ratio to the speed of movement of the conveying members or, by manual selection, may increase at a greater or lesser rate of speed at given areas along the effective travel as found desirable.

Another object of the invention lies in the provision of a means for grading articles by size which comprises a conveyor having a plurality of parallel conveying members carried at their ends by or from traveling chains having interposed at spaced intervals therein rigid elongated links and short chain lengths comprising a predetermined number of normal identical links, and means for varying the effective length of said chains for progressively varying the spacing between said conveying members; the chains passing over driving sprockets at each end of the conveyor in a normal manner; the sprockets at one end of the conveyor being provided with a take-up mechanism to compensate for the differential in length of the chain traveling over its effective common plane.

In accordance with our invention, articles to be graded will be fed onto the conveyor at a point where the spacing between the conveying members is at a minimum, and as the articles are carried along, the spacing increases progressively to effect release of articles of progressively increasing size from between the conveying members to be received by separate conveyor belts or other receptacles below the grading conveyor.

These and other objects of the invention will become apparent during the course of the following description wherein a preferred form of the invention is disclosed. It should be understood, however, that the drawings and specifications are illustrative only and are not intended to limit the scope of the invention beyond the limitations expressly set forth in the appended claims.

In the accompanying drawings forming a part of this specification and in which like numerals are employed to designate like parts;

Figure 1 is a plan view of a produce handling system including the grading machine which constitutes the subject matter of the present invention;

Figure 2 is an enlarged fragmentary side elevation having portions broken away for convenience of illustration;

Figure 3 is a still further enlarged fragmentary plan view of one end of the conveyor members and one driven chain;

Figure 4 is a transverse vertical cross section taken substantially one the line 4—4 of Figure 1 and upon an enlarged scale;

Figure 5 is an enlarged fragmentary plan view having portions broken away and disclosing the track adjusting means;

Figure 6 is a vertical cross section taken substantially at the line 6—6 of Figure 5;

Figure 7 is an enlarged cross section taken through the slip clutch constituting a rotation differential compensator;

Figure 8 is a still further enlarged fragmentary perspective showing the driven chain elements and associated parts supporting a conveyor member; and Figure 9 is a vertical cross section showing a modified form of conveying member.

Figure 1 shows in plan an article handling system which includes a sizing machine, indicated in its entirety by the numeral 10, which is adapted to receive articles, such as apples which have been previously washed and prepared, from any convenient source such as a delivery conveyor indicated by the numeral 11, over a positioning mechanism 12 which may be one of a number of devices for leveling and spreading the applies to be deposited upon the laterally extending conveying members 13. The members 13 are movable in a common horizontal plane at right angles to their several axes and during their effective operating travel have means provided for progressively widening the spacing between successive conveying members, thus resulting in apples of progressively increasing size being released by the conveying members at intervals along the effective working travel of the conveying members 13.

As seen in Figure 1, laterally extending belt conveyors 14 have their receiving ends disposed under the conveying members 13 to receive the apples dropped therefrom and convey them away from the grading machine to a tray filling machine indicated in general by the numeral 15. Subsequent to being filled, the trays 16 are carried by conveyor 17 to a tray stacking machine 18 where the trays are stacked to receive an encasing cardboard box or carton.

The present invention is particularly adapted for sizing delicate produce such as apples, peaches, citrus fruits, etc. The machine has been successively operated in a commercial packing house handling apples, and its description will be drawn as it relates to sizing apples for the purpose of illustration, but not for limiting the machine to this use, and applicants desire to claim their machine for every use of which it is susceptible.

Still referring to Figure 1 of the drawings, we have shown driving means in the form of a powered driving chain 20 which is trained about sprockets 21 and 22 carried respectively by a drive sprocket shaft 23 and a take-up sprocket shaft 24. In the drawing, the sprockets 21 and 22 appear to be of the same size. However, in actual practice, the sprocket 21 is provided with 36 teeth while the sprocket 22 is provided with 35 teeth. Although the exact number of teeth in the sprockets is of very little importance, the fact of the ratio differential between the two when driven by the same chain 20 is of great importance to the proper functioning of the present invention.

The sprocket 22 forms a part of a rotation differential compensator 25 whose details of construction may be clearly seen in Figure 7 of the drawing, wherein it will be seen that the rotation differential compensator 25 is a slip clutch having a clutch disc 26 which is fixed by means of key 27 to the take-up sprocket shaft 24. The sprocket 22 constitutes a second clutch disc and bears against the lining material 28 which is adhesively bound to the disc 26. The sprocket 22 is journaled at 29 on the collar 30 of the disc 26 for rotation thereabout.

A pressure plate 31 is disposed on the opposed side of the disc 26 and is united with the sprocket 22 by means of bolts 32 which extend loosely through apertures in the plate 31 and thread into the sprocket 22. Compression springs 33 surround the bolts 32 and apply a predetermined manually adjustable clamping pressure to the disc 26 between the plate 31 and the sprocket 22. It is thus noted that as the sprocket 22 is rotated, this rotary motion is imparted to the take-up sprocket shaft 24 through the rotation differential compensator 25 and should the shaft 24 be retarded in rotation, the differential in rotation will be compensated for by the slip clutch mechanism described.

Referring now in particular to Figures 2 and 4, it will be seen that the drive sprocket shaft 23 is provided with laterally spaced drive sprockets 34, and the take-up sprocket shaft 24 is provided with laterally spaced take-up sprockets 35. Obviously, the shafts 23 and 24 are journaled in bearings such as bearing 36 carried by the supporting frame 37 of the sizing machine. The sprockets 34 and 35 are constructed with circumferentially spaced groups 38 of sprocket teeth as seen in Figure 2 alternating with annular smooth portions which are disposed substantially at the diameter of the throats or valleys of the sprocket teeth, the purpose of which is to receive the rigid triangular members 41 as the chains 39 cooperate with the sprockets, as clearly seen in Figure 2.

The grading conveyor is seen to comprise spaced parallel driven chains 39 each of which is formed with a number of identical lengths 40 of flexible chain having a plurality of normal links, and the lengths 40 alternate with a number of rigid triangular members 41. It will be seen that the triangular rigid members 41 have a base 42 and an apex 43. As particularly seen in Figures 2 and 8 of the drawings, the chain lengths 40 are pivotally secured to the rigid member 41 at the base angles 44. The triangular rigid members 41 are each provided with a roller 45 journaled at the apexes 43 and thus are spaced from the plane common to the chain lengths 40 and the base 42 of the driven chains when in the expanded position as seen at the lower side of Figure 2.

The conveying members 13 are constructed from laterally extending inverted T-shaped members 46 which have axially extending journal pins 47 extending through journals formed in the triangular rigid members 41 at a point spaced from the axis of the roller 45 and, as here shown, also spaced from the pivotal connections of the chain lengths 40. The journal pins 47 extend through the members 41 and receive support rollers 48 on their outer free ends.

The frame 37 is provided with upper and lower support rails 49 and 50, which are here seen to be angle members welded or otherwise secured to the frame 37, and are adapted to support the driven chains 39 as they are moved over their upper effective common plane travel by rail 49 and their lower return travel by rail 50.

Spaced above the upper rails 49 we provide a pair of laterally spaced cam tracks 51 which are adjustably carried by the frame 37 in a manner hereinafter described. An inspection of Figure 2 will reveal that the tracks 51 are inclined with respect to the tracks 49 over which the conveying members 13 travel in a common plane along their effective working movement. The tracks 51 are provided with undulatory receiving end portions 52 which are adapted to strike the rollers 45 of the members 41 as the upper flight of the chains travel from left to right as viewed in Figure 2, and by this means the rigid members 41 are successively caused to rotate about the axis of their respective journal pin 47, that is, the axes of the conveyor members 13. It is thus seen in Figure 2 that the chain lengths 40 are disposed in angular relationship to the base 42 of the members 41, and thereby reduce the effective length of the chains 39 and dispose the successive conveying members 13 in near spaced relation.

As the tracks 51 diverge towards the right hand end of the machine as seen in Figure 2, the members 41 are permitted to pivot about the journal pins 47 progressively toward a position where the chain lengths 40 are in a common plane with the bases 42 of elements 41 and thereby progressively enlarge the spacing between successive conveying members 13 during their effective travel over the common plane and while supported on rail 49.

It is apparent from this description that the inclination of the cam tracks 51 with respect to the rail 49 is effective in controlling the spacing between successive members 13, and with a preset track 51 which does not vary from its initial position, the effective overall length of the chains 39 would not vary even though the spacing were to vary between the conveying members 13 as described. However, in the present invention, it is an important feature that the tracks 51 are manually adjustable toward and away from the rail 49 at a plurality of points along the length of the sizing machine, and therefore it becomes necessary that the take-up mechanism 25 be provided as a rotation differential compensator between the common driving chain 20 for shafts 23 and 24.

As indicated by the numeral 53 and detailed in Figures 4, 5, and 6 of the drawings, at a plurality of points spaced longitudinally of the grading machine 10, we provide means for varying the inclination of the spaced tracks 51 at commensurate points along their lengths simultaneously. Each of these means is seen to comprise a laterally extending shaft 54 having a manually operable crank 55 within easy reach at each side of the machine. The ends of the shaft 54 are threaded at 56 and extend through internally threaded collars 57 pivotally carried in the ends of swingable arms 58.

To prevent longitudinal shifting of the shaft 54, we provide one or more anchoring means 59 which is rigidly secured to a cross member 60 of the frame 37 and pivotally supports a bifurcated flange 61 which rotatably receives a spool 62 rigidly fixed to the shaft 54. The flange 61 is mounted on a rod 63 for vertical tilting movement, and thus permits vertical movement of the shaft 54 in a horizontal plane, but precludes longitudinal shifting thereof. Therefore, as a crank 55 is manually rotated, the turning shaft 54 will cause the internally threaded collar 57 to travel axially along the shaft 54, thus rotating the swingable arms 58 about their vertical axes defined by the bolts 64.

Concentric with the bolts 64, the swingable arms 58 are provided with lower cam faces 65 which cooperate with upper cam faces 66 formed on a member 67 rigidly secured at 68 to the tracks 51. Compression springs 69 encircle the bolts 64 and apply sufficient upward pressure to maintain the tracks 51 raised with the cam faces 65 and 66 in face to face engagement at all times. As the arms 58 are swung about their axes, the cams force the members 67 downwardly or permit their elevation, and thus control the inclination of tracks 51 with respect to rail 49.

Obviously, with a number of these control devices 53 spaced along the effective operating length of the table or sizing machine 10, the speed of separation of the members 13 may be varied at any selected point so that the ratio of increasing space between the conveying members 13 is not necessarily constant with the rate of travel of the chains 39 therealong.

The conveying members 13 are seen to comprise inflexible wires 70 which are formed in serpentine fashion and are secured as by rivets 71 to the horizontal flanges of the members 46, and together with the next successive wires 70 define pockets in which the apples *a* are supported until the spacing between the conveying members 13 become sufficient to permit the apples to drop from the pockets. The variations in size may be noted by inspection of Figure 3 where the apples are illustrated by dotted lines, and in Figure 2 where the spacings of the members 13 are contrasted at *a* and *b*.

With this structure, obviously it is necessary that the conveying members 13 be supported against axial rotation, and we therefore provide a clamping arm 72 for each conveying member 13 which has an offset fork 73 at its free end. The fork is adapted to receive the journal pin 47 of the next succeeding member 13, either forwardly or rearwardly, and thus maintain the conveying member 13 against axial rotation.

It will also be seen in Figure 9 that the clamping arm 72 is the means by which the journal pin 47 is secured to the member 46. The ends of the wires 70 extend into a bored boss 74 and they are thus supported against deflection. It is also to be noted that the wires 70 are provided with rubber or other resilient cushioning material at 75 to prevent bruising of the produce or apples *a*.

In Figure 8, the preferred form of the invention, the member 46 is provided with a rubber bumper strip 76, and in Figure 9, a modified form of the invention shows a molded plastic member 77 which forms pockets and is carried by the vertical flange of the member 46 replacing the wires 70.

Having thus described our invention, we claim:

1. A machine for grading articles by size comprising a conveyor embracing in its construction a pair of spaced parallel driven chains; each formed with a number of identical lengths of flexible chain alternating with a number of rigid members each substantially longer than a link of said lengths of chain; a roller journaled on each said rigid member at a point spaced from a plane common to said rigid members and said lengths of chain; said driven chains each being trained about a driving sprocket and a take-up sprocket carried by journaled shafts spaced longitudinally of the machine; driving means having means for rotating said take-up sprocket shaft at a faster speed than said drive sprocket shaft; a slip clutch interposed between and operably interconnecting said driving means and said take-up sprocket shaft and constituting a rotation differential compensator therebetween; laterally extending conveying members each having its end journaled on opposed rigid members of said chains; said conveying members each having a plurality of half pockets adapted to cooperate with half pockets of the next adjacent conveying members to form an article receiving pocket; means operably interconnecting successive conveying members for securing said conveying members against axial rotation during their effective operating travel; tracks inclined with respect to said common plane cooperating with said rollers for rotating said rigid members about the journal axes of their respective conveying members; and manually operable means for varying the inclination of said tracks at multiple locations along their lengths.

2. The invention as defined in claim 1 wherein the means for maintaining said conveying members against axial rotation comprises forks each slidably receiving a conveying member therebetween, and said forks having arms extending parallel to the movement of said chains and rigidly fixed to the next successive conveying member.

3. A machine for grading articles by size comprising a conveyor embracing in its construction a pair of spaced parallel driven chains; each formed with a number of identical lengths of flexible chain alternating with a number of rigid members each substantially longer than a link of said lengths of chain; a roller journaled on each said rigid member at a point spaced from a plane common to said rigid members and said lengths of chain; said driven chains each being trained about a driving sprocket and a take-up sprocket carried by journaled shafts spaced longitudinally of the machine; driving means having means for rotating said take-up sprocket shaft at a faster speed than said drive sprocket shaft; a slip clutch interposed between and operably interconnecting said driving means and said take-up sprocket shaft and constituting a rotation differential compensator therebetween; laterally extending conveying members each having its ends journaled on opposed rigid members of said chains spaced from said roller axes; tracks inclined with respect to said common plane cooperating with said roller for rotating said rigid members about the journal axes of their respective conveying members; and manually operable means for varying the inclination of said tracks at multiple locations along their lengths.

4. A machine for grading articles by size comprising a conveyor embracing in its construction a pair of spaced parallel driven chains, each formed with a number of identical lengths of flexible chain alternating with a number of rigid members each substantially longer than a link of said lengths of chain; a roller journaled on each said rigid member at a point spaced from a plane common to said rigid members and said lengths of chain; said driven chains each being trained about a driving sprocket and a take-up sprocket carried by journaled shafts spaced longitudinally of the machine; driving means; means for rotating said take-up sprocket shaft at a faster speed than said drive sprocket shaft; a rotation differential compensator operably interconnecting said driving means and said take-up sprocket shaft; laterally extending conveying members each having its ends journaled on opposed rigid members of said chains spaced from said roller axes; tracks inclined with respect to said common plane cooperating with said roller for rotating said rigid members about the journal axes of their respective conveying members; and manually operable means for varying the inclination of said tracks at multiple locations along their lengths.

5. The invention as defined in claim 4 wherein the means for varying the inclination of said tracks at multiple locations along their lengths comprises: means urging said tracks toward a common extreme position of inclination; pairs of cams rigidly fixed to said tracks at a plurality of transversely opposed points to oppose the bias of said means; cam actuating levers journaled on a fixed element of said machine and disposed one to actuate each pair of said cams and manually operable means uniting said levers effecting commensurate cam actuating movement from manual manipulation of said means.

6. A machine for grading articles by size comprising a conveyor embracing in its construction a pair of spaced parallel driven chains each formed with a number of identical lengths of flexible chain alternating with a number of rigid members, each substantially longer than a link of said lengths of chain; said driven chains each being trained about a driving sprocket and a take-up sprocket carried by journaled shafts spaced longitudinally of the machine; driving means having means for rotating said take-up sprocket shaft at a faster speed than said driving sprocket shaft; a rotation differential compensator operably interconnecting said driving means and said take-up sprocket shaft; laterally extending conveying members each having its ends carried by opposed rigid members of said chains; means for guiding movement of said conveying members in a common plane over a part of their travel; and means for rotating said rigid members about the axes of said conveying members to a limited degree whereby the effective overall length of said chains is varied.

7. A machine for grading articles by size comprising a conveyor embracing in its construction a pair of spaced parallel driven chains each including as interlinking parts thereof rigid members spaced equidistant along the length of said chains; laterally extending conveying members each having its ends carried by opposed rigid members of said chains; means for effecting movement of said conveying members in a common plane over a part of their travel; means for rotating said rigid members about the axes of said conveying members to a limited degree, whereby the effective overall length of said chain is varied; driving means having compensating means for driving said chains and compensating for the variations in the lengths of said chains; and means for selectively varying the effect of said last named means on said rigid members at a plurality of independent points along said common plane.

References Cited in the file of this patent

UNITED STATES PATENTS

| | | |
|---|---|---|
| 1,302,002 | Boyer | Apr. 29, 1919 |
| 1,448,689 | Hatch | Mar. 13, 1923 |
| 1,725,665 | Mae | Aug. 20, 1929 |
| 2,229,973 | Hormel | Jan. 28, 1941 |
| 2,441,154 | Kerian | May 11, 1948 |
| 2,661,840 | Ballard | Dec. 8, 1953 |